US007850847B2

(12) United States Patent  
Brown (10) Patent No.: US 7,850,847 B2
(45) Date of Patent: Dec. 14, 2010

(54) FILTRATION SYSTEM MANIFOLDS (76) Inventor: Peter Gordon Brown, 4 Ney Road, Capalaba (AU) QLD 4157

( * ) Notice: Subject to any disclaimer, the term of this patent is extended or adjusted under 35 U.S.C. 154(b) by 973 days.

(21) Appl. No.: 11/573,766

(22) PCT Filed: Aug. 15, 2005

(86) PCT No.: PCT/AU2005/001214

§ 371 (c)(1),
(2), (4) Date: Feb. 15, 2007

(87) PCT Pub. No.: WO2006/017887

PCT Pub. Date: Feb. 23, 2006

(65) Prior Publication Data

US 2008/0093275 A1 Apr. 24, 2008

(30) Foreign Application Priority Data

Aug. 16, 2004 (AU) .............................. 2004904623

(51) Int. Cl.
*B01D 63/06* (2006.01)
(52) U.S. Cl. .................................. 210/321.8; 210/330
(58) Field of Classification Search ..............................
210/321.78–321.81, 252–253, 434, 232,
210/336, 339, 330, 442, 321.87–321.89,
210/323.2, 450, 439, 335
See application file for complete search history.

(56) References Cited

U.S. PATENT DOCUMENTS 3,366,246 A * 1/1968 Goldsmith .................. 210/436
3,608,730 A * 9/1971 Blaha .................... 210/321.89
3,666,109 A * 5/1972 Goeldner ................ 210/321.87
3,734,297 A * 5/1973 Windle ................... 210/321.87
4,016,078 A * 4/1977 Clark ........................... 210/94
5,022,896 A    6/1991 Chang
5,045,197 A    9/1991 Burrows
5,647,973 A * 7/1997 Desaulniers ................ 210/96.2
6,059,970 A * 5/2000 Kohlheb et al. .......... 210/321.6
2003/0173311 A1   9/2003 Younger et al.

FOREIGN PATENT DOCUMENTS

JP   51009081 A * 1/1976
WO      9104783 A1   4/1991
WO      9825694 A1   6/1998

* cited by examiner

*Primary Examiner*—Terry K Cecil
(74) *Attorney, Agent, or Firm*—Kirton & McConkie; Evan R. Witt (57) ABSTRACT

A filtration system includes two end manifolds formed from blocks which are adapted to receive two or more reverse osmosis filtration tubes and to provide separate flow channels for the feed and filtered flows through the tubes. The end manifolds are machined from a block of nylon or similar resilient material and have cylindrical grooves formed to receive the outer and inner tubes of the filtration tubes and annular grooves formed within these cylindrical grooves to restrain O rings which seal the outer and inner tubes have channels formed between the cylindrical grooves which receive the outer and inner tubes of the filtration tubes which channels provide separate flow paths for the feed and filtered flows.

19 Claims, 8 Drawing Sheets

FILTRATION SYSTEM MANIFOLDS

FIELD OF THE INVENTION

This invention relates to end manifolds, which facilitate the assembly and improve the integrity of banks of filtration tubes.

BACKGROUND OF THE INVENTION

Filtration systems such as reverse osmosis water purifiers usually employ banks of filtration tubes mounted on a supporting structure such as a wall. There are typically two streams of fluid passing through the tubes for example the brackish water supply stream and the filtered water stream of a reverse osmosis system.

Accordingly the banks of tubes have to be connected by multiple plumbing connectors to create two separated streams and the assembly of a bank of filtration tubes is time consuming and costly. Further, since the supply stream is usually under high pressure, leakage of standard plumbing connectors is often a problem.

Attempts to overcome these deficiencies in existing filtration systems have centred around providing improved individual high pressure plumbing connectors. Whereas this minimizes leakage problems it often increases the time and cost of assembly and installation.

OBJECT OF THE INVENTION

It is therefore an object of the invention to provide end manifolds for banks of filtration tubes, which overcome or at least reduce the above problems or at least provide an alternative method of assembling and maintaining filtration systems.

STATEMENT OF THE INVENTION

According to the present invention a filtration system end manifold is formed from a block which is adapted to receive one or more filtration tubes and to provide separate flow channels for the feed and filtered flows through the tubes.

Preferably the end manifold is machined from a block of nylon or similar resilient material.

Preferably the end manifold has cylindrical grooves formed to receive the outer and inner tubes of a filtration tube and annular grooves formed within these cylindrical grooves to restrain O rings which seal the outer and inner tubes.

Preferably the end manifold has channels formed between the cylindrical grooves which receive the outer and inner tubes of the filtration tube, which channels provide separate flow paths for the feed and filtered flows.

In an alternative form of the present invention a filtration system has two end manifolds which are adapted to receive a bank of one or more filtration tubes.

Preferably the end manifolds are clamped by one or more longitudinal retaining bolts.

Preferably one end manifold is adapted to carry a three way discharge valve and a sensor for the filtered flow such that the sensor informs a controller to switch the filtered flow from storage to waste when the quality of the filtered flow falls below a preset limit.

Preferably one end manifold is adapted to carry a needle valve and pressure gauge to monitor and regulate the pressure of the feed flow.

Preferably the end manifolds are provided with resilient supporting pads.

In yet another form of the present invention a method of assembling a bank of filtration tubes is provided by press fitting the end manifolds onto opposite ends of the filtration tubes and clamping them in place by one or more longitudinal bolts extending between the manifolds.

BRIEF DESCRIPTION OF THE DRAWINGS

Various embodiments of the invention are now described by way of example only with reference to the accompanying drawings in which.

DETAILED DESCRIPTION OF THE INVENTION

Figure 1:
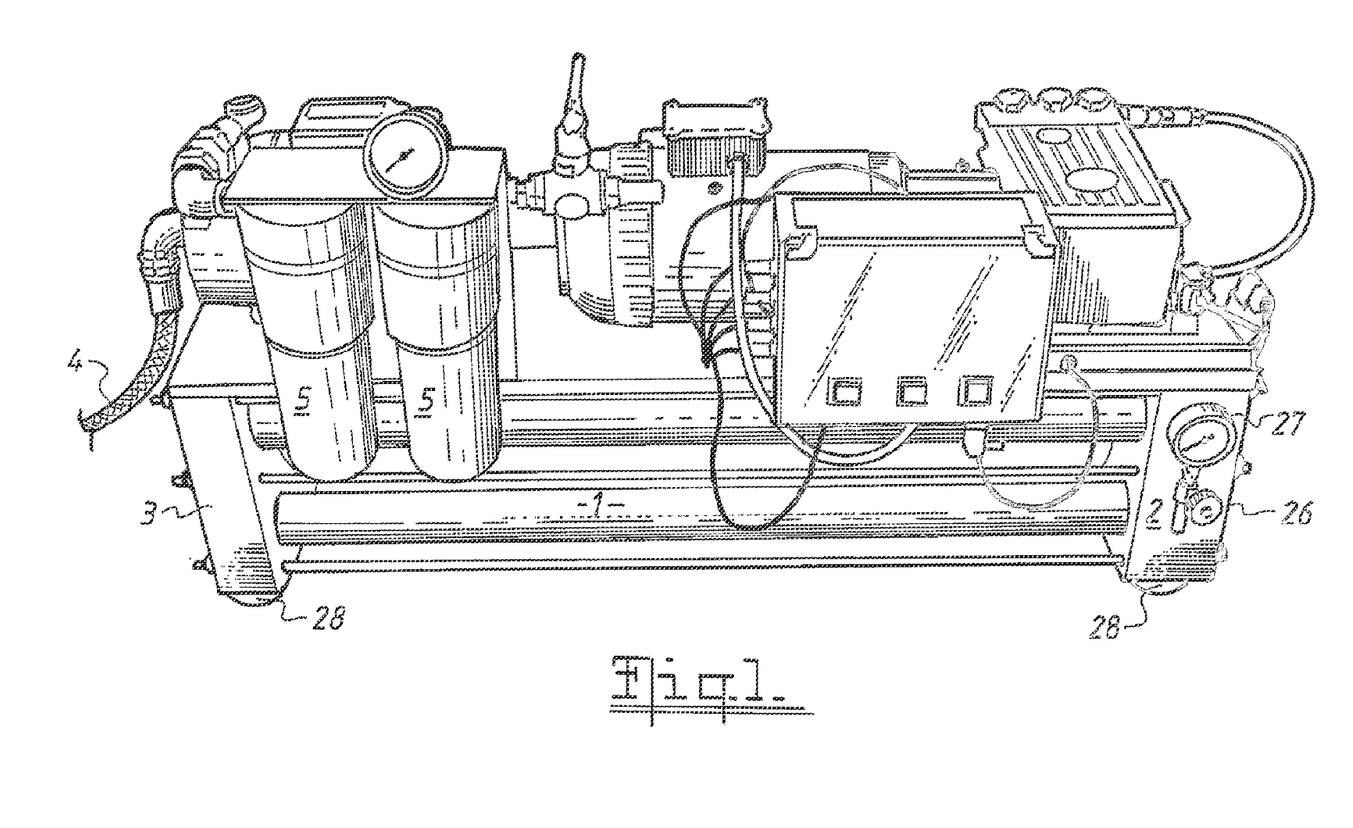
FIG. 1 is a perspective view from above of a reverse osmosis desalination unit
Figure 2:
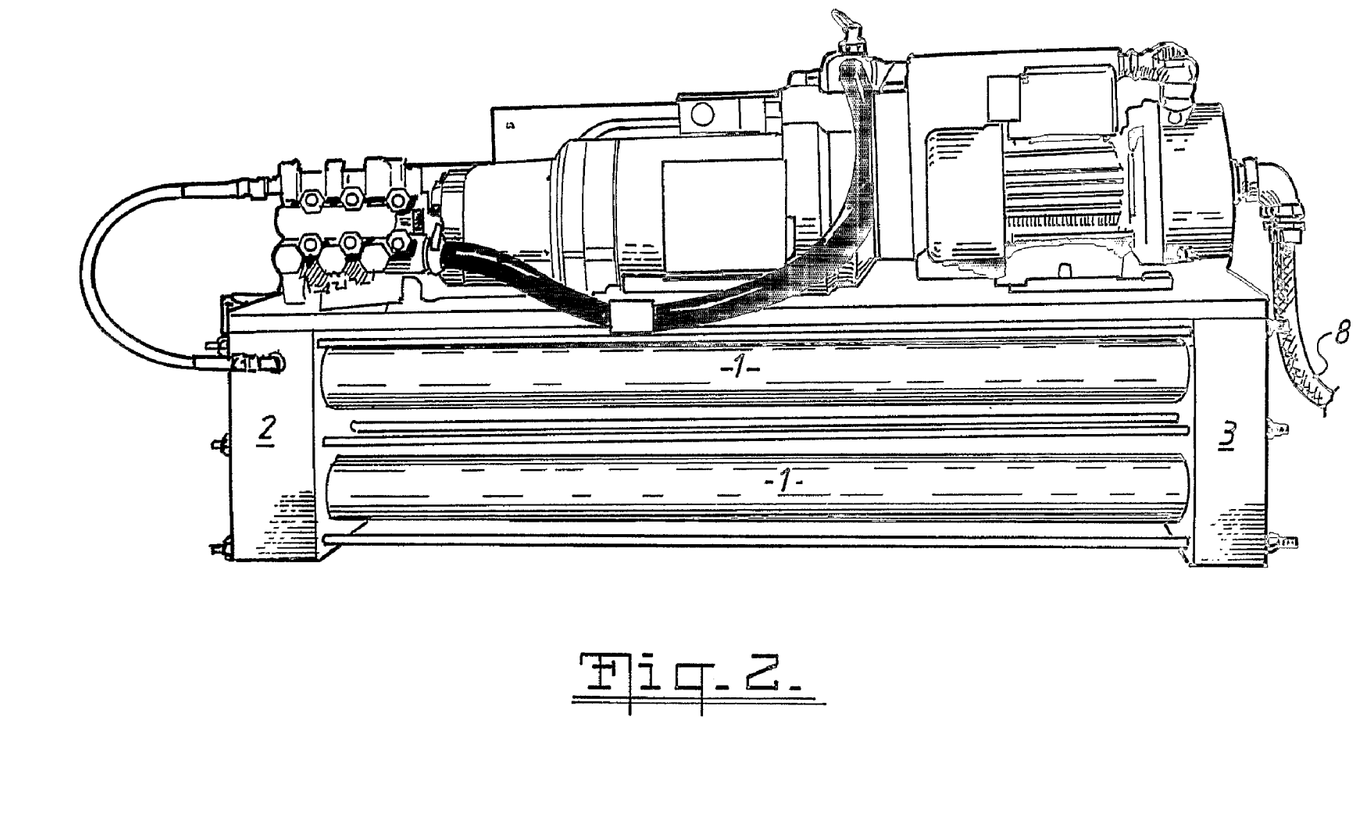
FIG. 2 is a rear perspective view of the unit in FIG. 1
Figure 3:
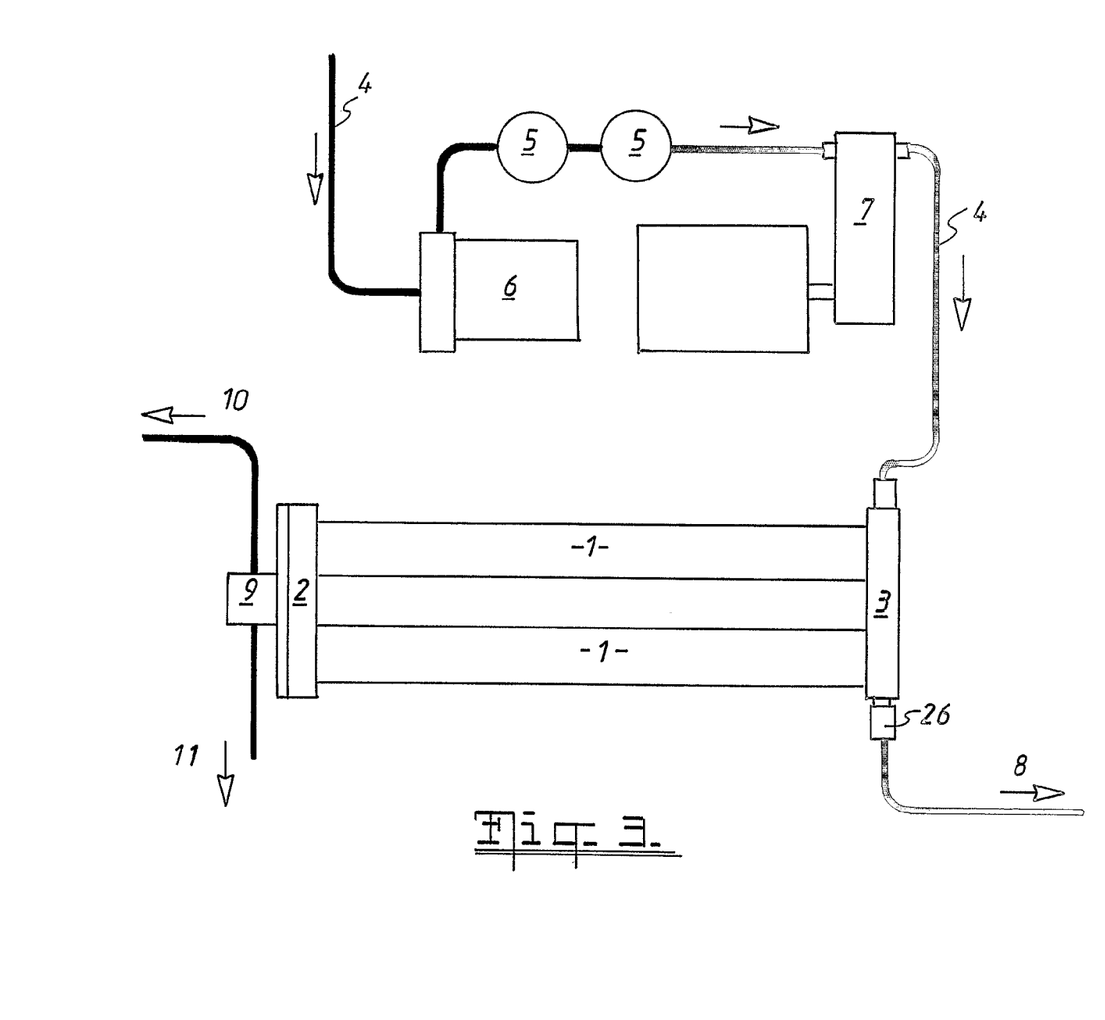
FIG. 3 is a diagram showing the salt water and filtered water streams into and out of the bank of reverse osmosis filtration tubes

FIGS. 1 and 2 are front and rear views respectively of a four tube 1 reverse osmosis desalination unit assembled with end manifolds 2 and 3 of the present invention. FIG. 3 provides a schematic showing the direction of flow of salt water from the sea 4 pumped through pre filters 5 by pump 6 and then through a bank of filtration tubes 1 by pump 7 and returned to the sea 8. Also shown is a three way valve 9 at the end manifold 2 which directs the filtered water stream to a reservoir 10, or to an overflow 11 when it is not at the required level of purity.

Figure 4:
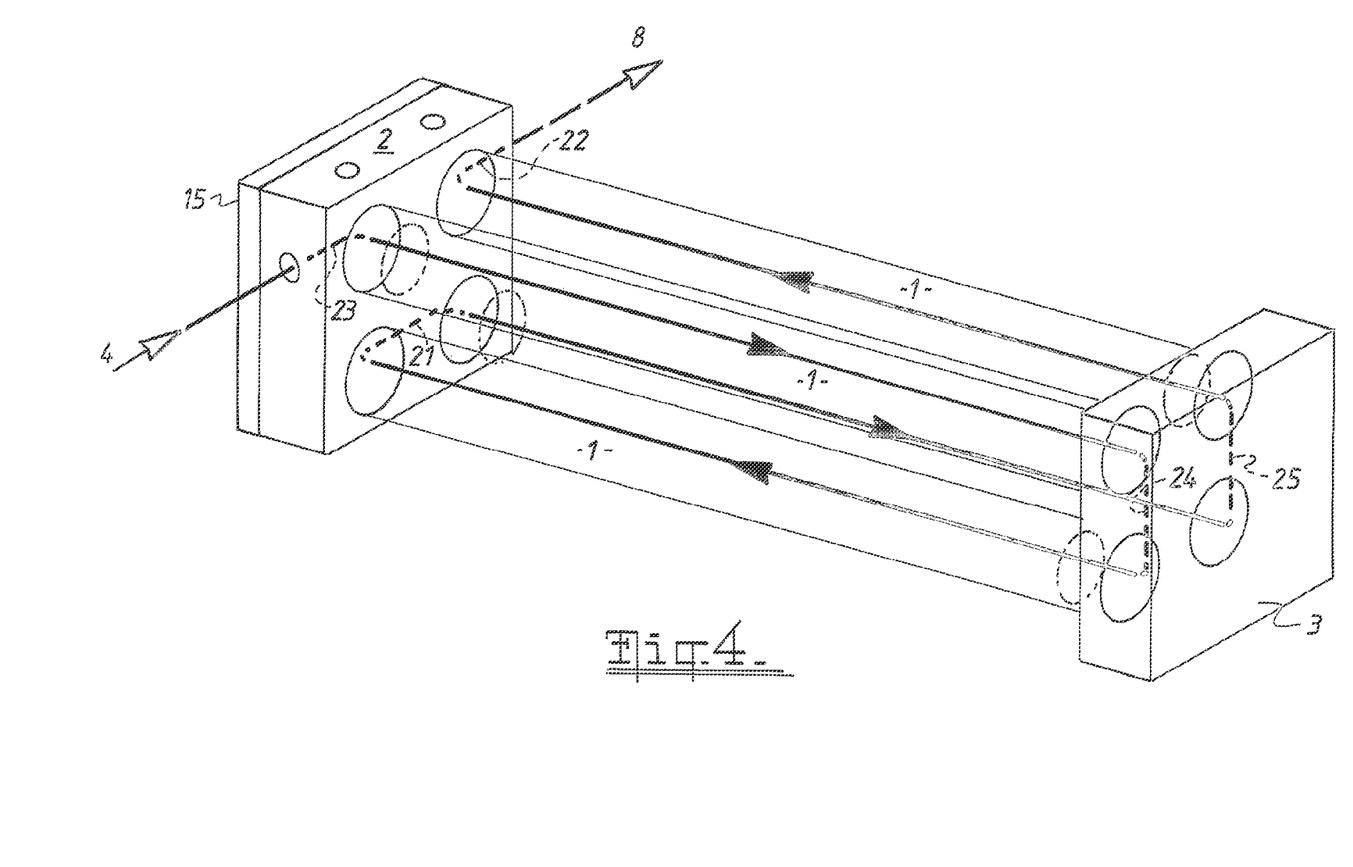
FIG. 4 shows the salt water flow through the outer reverse osmosis filtration tubes
Figure 5:
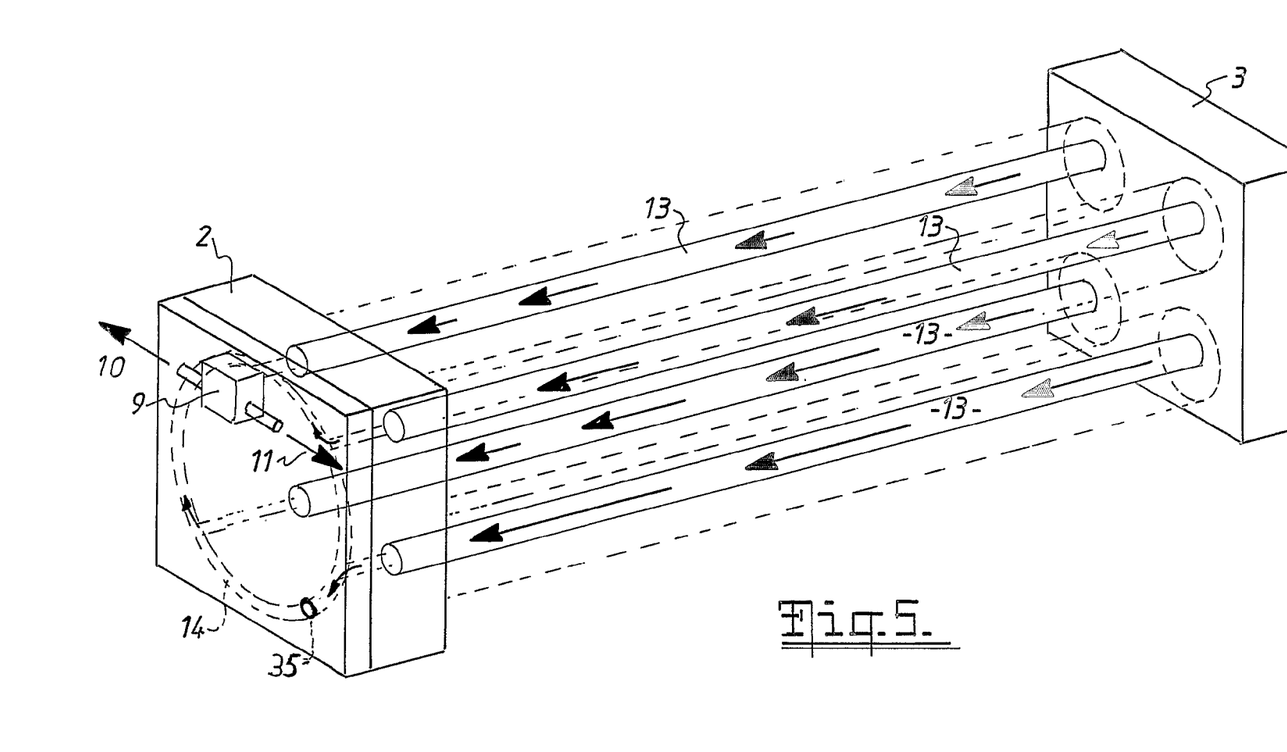
FIG. 5 shows the filtered water flow through the inner reverse osmosis filtration tubes

FIG. 4 illustrates the salt water stream through the filtration tubes revealing in dotted outline, connecting channels 21, 22, 23, 24 machined in end manifolds 2 and 3. The reverse osmosis filtration tubes have an outer tube 1, carrying the saltwater stream 4 which is separated by filter membranes from the inner tube 13. The filtered water 10 flows through the inner tubes 13 as illustrated in FIG. 5. The inner tubes 13 are blocked by end manifold 3 and the filtered water 10 drains through inner tubes 13 to an annular channel 14 machined in the manifold 2. Channel 14 drains to a three way valve 9 mounted on an end retaining plate 15 of manifold 2.

Figure 6:
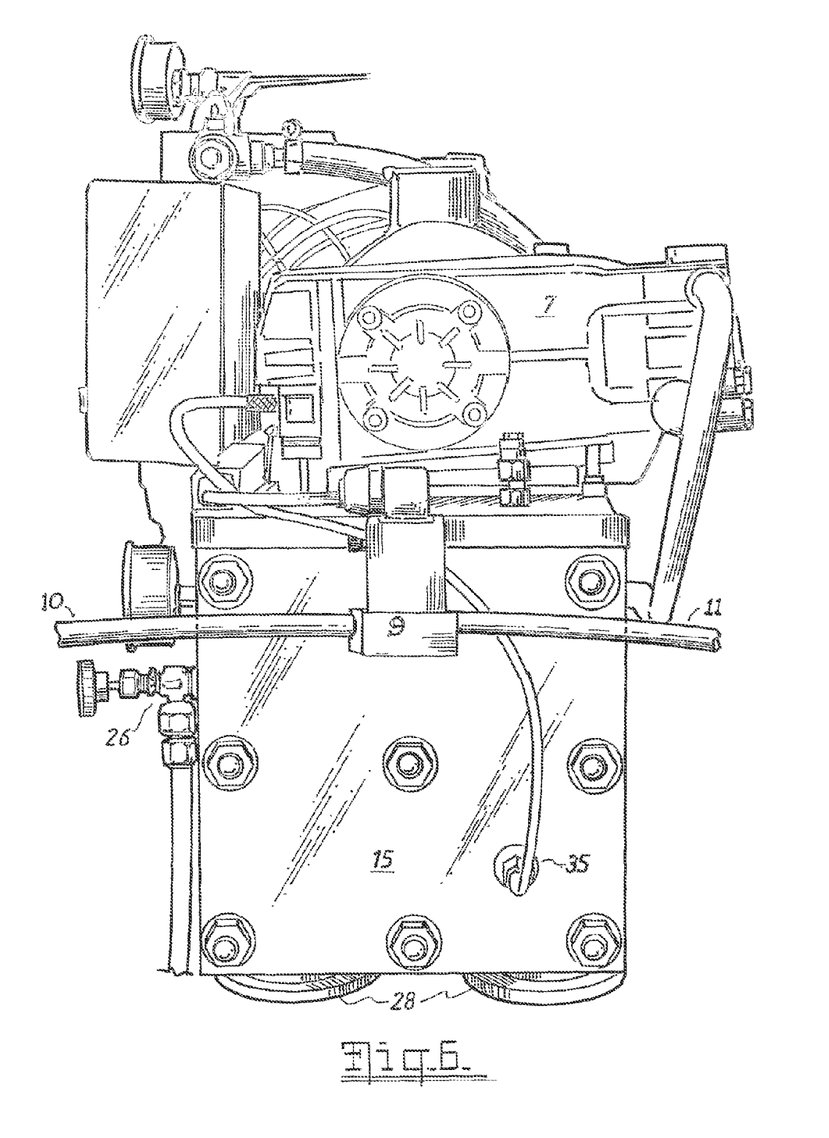
FIG. 6 is an end view from the right of the unit shown in FIG. 1

In FIG. 6 manifold 2 is shown in the assembled filtration unit with three way valve 9 mounted at the top of manifold 2 and tapping into the top of channel 14. A water quality sensor 35 is located at the bottom right hand circumference of channel 14 and monitors the quality of the filtered water stream. When this stream is of the required quality, valve 9 directs water to the reservoir but if the quality falls below a preset limit, valve 9 is operated electrically from control panel 16 to divert the filtered water stream to overflow 11.

Figure 7:
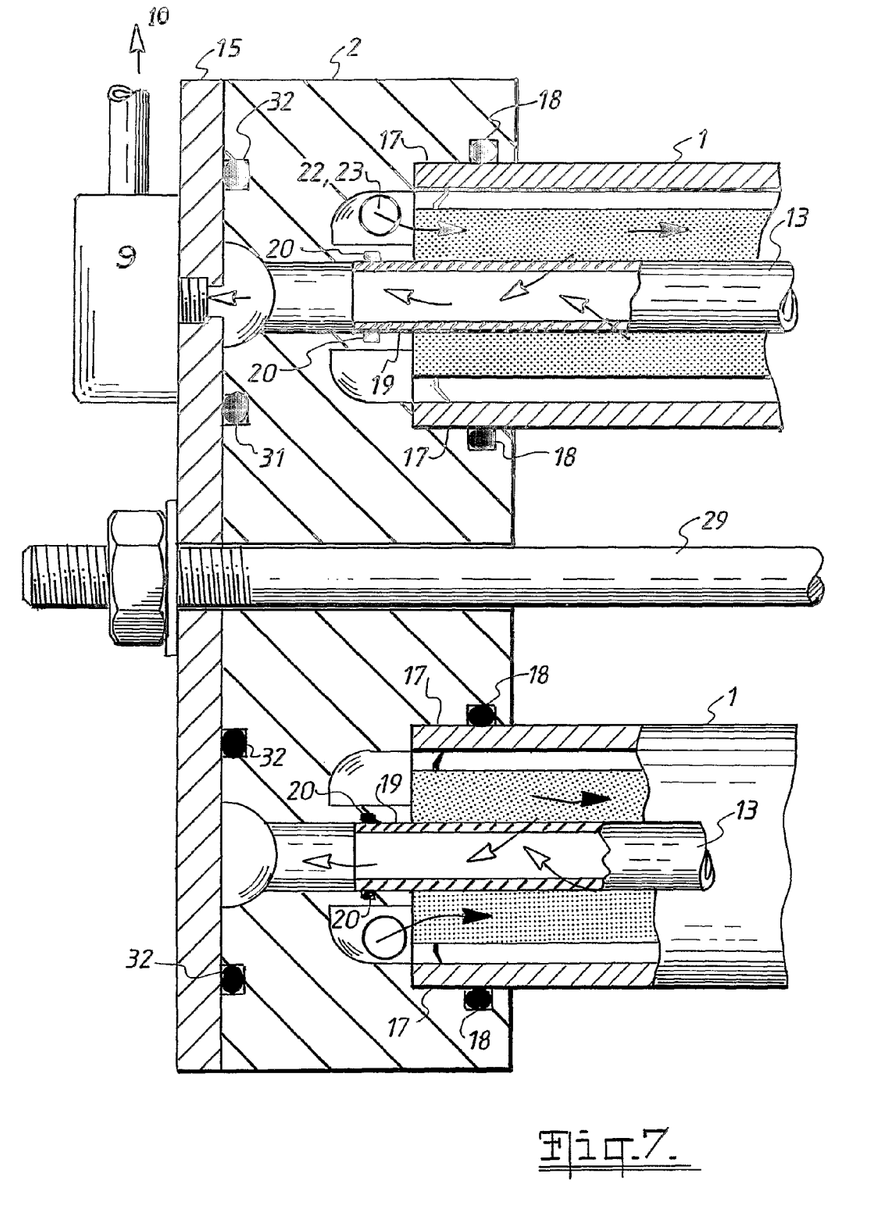
FIG. 7 is a cross section through the centre line of the end manifold shown in FIG. 6

The cross section view of FIG. 7 reveals the detailed machining of manifold block 2 and the retaining plate 15. The outer filtration tubes 1 are received in cylindrical recesses 17 machined into block 2. Annular grooves 18 are machined within the walls of recesses 17 to accommodate O rings which seal the saltwater flow in outer tubes 1. Inner tubes 13 fit into smaller cylindrical recesses 19 machined in the end walls of large recesses 17 and smaller O rings fit into machined grooves 20 to seal off the filtered water flow.

The two outer tubes 1 at the bottom of the bank are connected by channel 21 drilled through the end manifold block between the two cylindrical recesses 19 holding the outer tubes 1. Channels 22 and 23 are also drilled in the upper section of the manifold block 2 to respectively discharge from and receive into the tubes, the saltwater stream 8 and 4. Similarly, channels 24 and 25 are drilled vertically in the manifold block 3 at the opposite end, to provide the saltwater pathway between the outer tubes 1 at the other end of the unit.

The saltwater flow 4 is pumped at pressures of 900-1000 psi through the outer tubes 1 and this pressure is maintained by an adjustable needle valve 26 mounted on the side of the manifold block 2 where the saltwater flow 8 leaves the filtration unit. A pressure gauge 27 built into the needle valve 26 monitors the pressure of the saltwater stream. Elastic pads 28 mounted on the base of the end manifold blocks 2,3 support the unit and cushion any vibration.

The reverse osmosis filtration tubes are provided by manufacturers in standard lengths. These are cut to the length required for the unit in two separate cutting operations so that the inner filtered water tubes 13 extend beyond the outer tubes 1 carrying the saltwater, at both ends. Accordingly in order to assemble the bank of filtration tubes 1, O rings are located in grooves 18, 20 and the ends of tubes 1 are inserted into the machined recesses 17, 19 of both end manifolds 2,3 and longitudinal retaining bolts 29 are passed through holes 30. The nuts on bolts 29 are then uniformly tightened thus ensuring that the bank of tubes 1 is held firmly within the end manifolds 2,3.

When tubes 1 are thus firmly held, the O ring seals operate to make the junctions of tubes 1 with the manifold block 2,3 watertight at the high operating pressures of the system. Similarly end plate 15 presses against the O rings located in grooves 31,32 on either side of the filtered water annular channel thus sealing off the flow.

Figure 8:
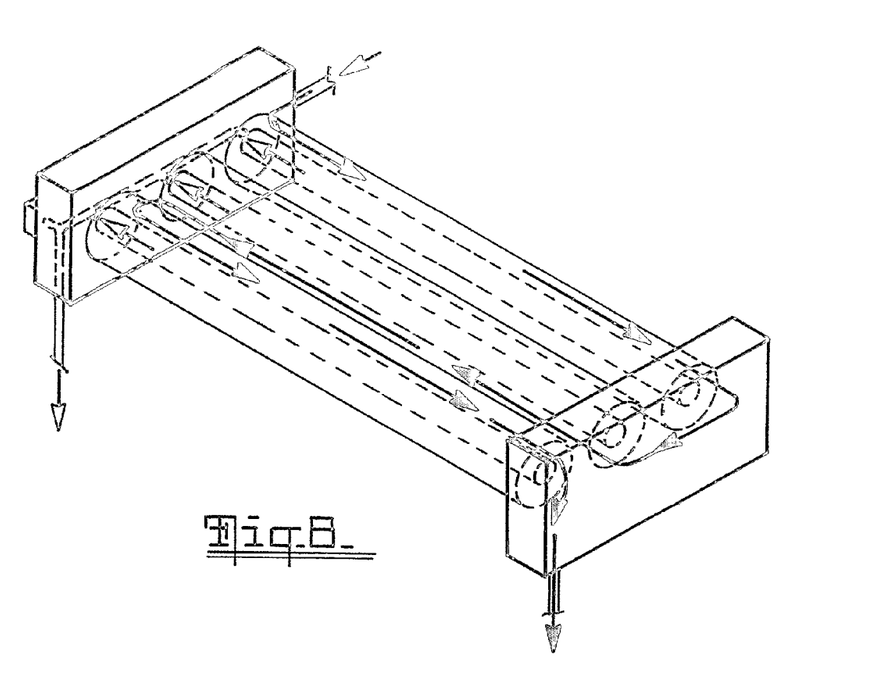
FIG. 8 is a diagram showing the salt water and filtered water streams into and out of a bank of three reverse osmosis filtration tubes and FIG. 9 is a diagram showing the salt water and filtered water streams into and out of a bank of two reverse osmosis filtration tubes.
Figure 9:
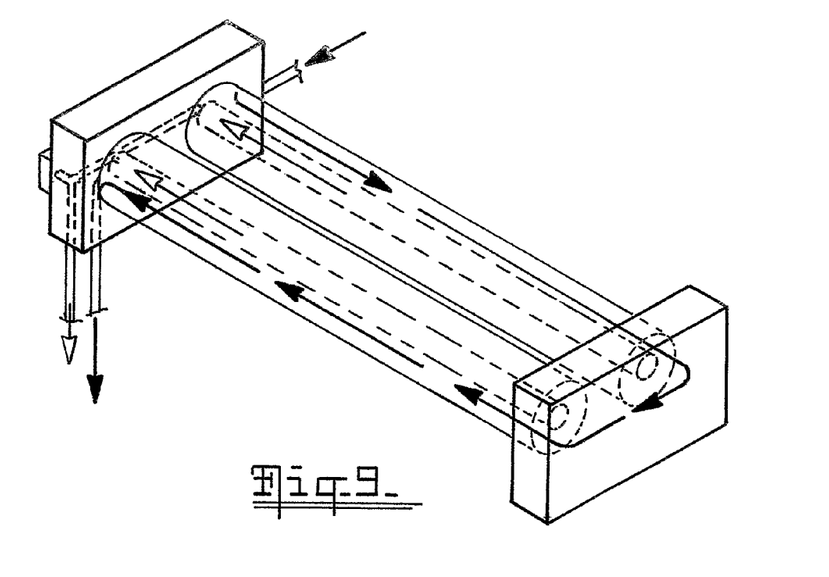

This mode of assembly of a bank of filtration tubes reduces significantly the time and cost of assembly. Further the provision of O ring seals restrained in machined grooves within the manifold blocks provide an effective seal at the high hydraulic pressures of operation of the filtration system. FIGS. 8 and 9 show the salt water and filtered water streams into and out of banks of three and two tubes respectively, illustrating that the end manifolds can be designed in accordance with the present invention for banks of two or more tubes.

VARIATIONS

It will be realised that the foregoing has been given by way of illustrative example only and that all other modifications and variations as would be apparent to persons skilled in the art are deemed to fall within the broad scope and ambit of the invention as herein set forth. For example end block manifolds according to the invention could be used for banks of large numbers of tubes with similar manifold channel design and the manifolds themselves could be manufactured by a casting or a molding process.

Throughout the description and claims of this specification the word "comprise" and variations of that word such as "comprises" and "comprising" are not intended to exclude other additives, components, integers or steps.

The invention claimed is:

1. A filtration system comprising:
   a first end manifold;
   a second end manifold; and
   two or more reverse osmosis filtration tubes that each comprise an outer feed-flow tube and an inner filtered-flow tube, wherein:
   the inner filtered-flow tube is disposed within the outer feed-flow tube,
   each inner filtered-flow tube is received within an inner tube recess in both the first and the second end manifolds,
   each outer feed-flow tube is received within an outer tube recess in both the first and the second end manifolds,
   a first channel is disposed within the first end manifold and extends between at least two inner tube recesses,
   a second channel is disposed within the second end manifold and extends between at least two outer tube recesses, and
   the second end manifold blocks fluid flow at an end of each of the inner tubes.

2. The filtration system of claim 1 in which the first and the second end manifolds are machined from a block of nylon or another resilient material.

3. The filtration system of claim 1 in which the first and the second end manifolds each have annular grooves formed within each of the outer and inner tube recesses to restrain O rings which seal the outer and inner tubes, respectively.

4. The filtration system of claim 1 in which at least one channel is formed by drilling through a block selected from the first end manifold and the second end manifold and plugging one or more external holes so formed to maintain a unidirectional flow in the at least one channel.

5. The filtration system of claim 4 in which a component selected from the first end manifold and the second end manifold is adapted to carry a needle valve and pressure gauge to monitor and regulate the pressure of a feed flow.

6. The filtration system of claim 1 in which the first and the second end manifolds are clamped together by one or more longitudinal retaining bolts.

7. The filtration system of claim 1 in which the first end manifold is adapted to carry a three way discharge valve and a quality sensor for the filtered flow such that the sensor informs a controller to switch the filtered flow from storage to waste when the quality of the filtered flow falls below a preset limit.

8. The filtration system of claim 1 in which the first and the second end manifolds are provided with resilient supporting feet.

9. The filtration system of claim 1 wherein each of the inner tube recesses terminates deeper within the first end manifold than each of the outer tube recesses.

10. The filtration system of claim 1 wherein the first end manifold further defines a third channel that extends between at least two outer tube recesses.

11. The filtration system of claim 1 wherein the first channel comprises an annular channel that extends between at least three inner tube recesses.

12. The filtration system of claim 1, wherein the first channel comprises a groove formed within the first manifold end, and wherein an end plate is attached to the first manifold end to seal the groove and form the first channel.

13. A filtration system comprising:
    a first end manifold formed from a first block;
    a second end manifold formed from a second block; and two or more reverse osmosis filtration tubes, wherein each of the filtration tubes comprises an inner filtered-flow tube and an outer feed-flow tube, wherein:

each outer tube is received in an outer tube recess in both the first and the second end manifolds, each inner tube is received in an inner tube recess in the first and the second end manifolds, the inner tube recesses terminate further within the first end manifold than the outer tube recesses, a first channel disposed within the first end manifold is formed between at least two inner tube recesses, and a second channel disposed in the second end manifold is formed between at least two outer tube recesses.

14. The filtration system of claim 13, further comprising a third channel that is disposed within the first end manifold, wherein the third channel extends between at least two outer tube recesses.

15. The filtration system of claim 13, wherein the first channel comprises a groove formed within the first end manifold, and wherein an end plate is attached to the first end manifold to seal the groove and form the first channel.

16. The filtration system of claim 15, wherein the first channel comprises an annular channel that is formed between at least three inner tube recesses.

17. The filtration system of claim 13, wherein the first end manifold further comprises a feed flow inlet, a discharge outlet, and a filtered flow outlet.

18. The filtration system of claim 13, wherein a feed flow moves serially through the outer feed-flow tubes, and the filtered flow moves parallelly through the inner filtered-flow tubes.

19. The filtration system of claim 13, wherein each of the inner filtered-flow tubes is longer than each of the outer feed-flow tubes.

* * * * *